United States Patent Office 2,980,650
Patented Apr. 18, 1961

2,980,650

PREPARING POLYMERS UNDER VACUUM

Christoper L. Wilson, Sloatsburgh, and Henry George Hammon, Piermont, N.Y., assignors to Hudson Foam Plastics Corporation, Yonkers, N.Y., a corporation of New York No Drawing. Filed July 8, 1954, Ser. No. 442,195

14 Claims. (Cl. 260—75)

The present invention relates to improved methods of making polyester resins and, more particularly, to improved methods of making polyester resins having the form of relatively heavy viscous liquids.

It has been known to make condensation polymers, by the reaction of dibasic acids with polyhydric alcohols. Many of these resins have attained widespread industrial use as paint and enamel bases, as bonding agents in construction materials using glass fibers and the like, as reinforcing fillers. For these uses, tough hard resins are desired in the final cured stage. To impart toughness and hardness to the resins they must be cross-linked after application. Aromatic components, such as phthalic acid, are usually necessary components of this type of resin.

It has been also known previously that cross-linking of the molecular chains of the polyester condensation products can be accomplished in various ways. If unsaturated components are included in the reaction mixtures, cross-linking can be brought about by vinyl polymerization by adding peroxide catalysts. Application of heat usually promotes the cross-linking reaction.

The present invention relates to resins known more particularly as polyester resins. It has been known that these resins are, in general, made by condensing aliphatic dibasic acids with ethylene glycol or polyethylene glycols. However, when ethylene glycol, itself, is used, the product is usually hard or even crystalline. Although the tendency to crystallize can be inhibited by admixing glycols, such as propylene glycol, with the ethylene glycol, the presence of methyl groups along the polymer chains introduces undesirable mechanical weaknesses. It is also not possible to get all of the desired physical properties into the resin by adding glycols such as propylene glycol for the following reason. The polyesters can be made by heating the components together until water is evolved. Another process makes use of an alcohol exchange reaction between a glycol and simple aliphatic ester of the acid component, such as a methyl ester, in the presence of a catalyst such as lead monoxide or sodium alkoxide. During the condensation process, the molecular weight rises steadily and the viscosity increases. At the same time, the acid and the hydroxyl numbers both fall. When, however, the molecular weight reaches a certain magnitude, say of the order of 1000, reaction slows down.

In the present invention it is desired to make resins which are viscous liquids. Using the methods described immediately above it is not possible to get liquids having a high enough viscosity for many industrial uses. It has now been found, in accordance with the present invention, that it is possible to make polyester resins of high molecular weight having a voscosity between about 0.05 and 0.36, hydroxyl numbers of up to about 200 and acid numbers up to about 50 which are useful in making lubricants, greases, hydraulic fluids, plasticizers, adhesives and rubbery foams, along with many other products.

One object of the present invention is to provide improved polyester resins in the form of viscous liquids.

Another object of the invention is to provide improved methods of making polyester resins in the form of viscous liquids.

Another object of the invention is to provide improved polyester resins in liquid form, having relatively high viscosities and also relatively high acid and hydroxyl numbers.

Another object of the invention is to provide improved processes of making polyester resins in liquid form with controlled molecular weight and viscosity.

The invention will now be described in greater detail.

The improved resins of the present invention are prepared by reacting simple dibasic acids having saturated straight chains between terminal carboxyl groups, polyethylene glycols and certain polyhydroxy compounds containing more than two hydroxyl groups. Either of two general methods may be employed. One of these is to heat a mixture of the components, first at atmospheric pressure until a large proportion of the theoretically expected water has been evolved and then in a vacuum until the desired characteristics such as viscosity and acid and hydroxyl numbers have been attained. The other method is to heat the hydroxylic components with a simple aliphatic ester of the dibasic acid or acids together with a basic or an acidic catalyst. In this method the simple alcohol is evolved again and the process is continued until the resin produced has the desired characteristics. In the first method a low acid number is attained by choosing the correct ratio of components. Excess glycol is used which is partially removed by the vacuum treatment. The alcohol exchange method has the advantage that the polyester resin which is produced always has a very low acid number.

For purposes of the present invention, the hydroxyl and acid numbers are defined as the number of milligrams of potassium hydroxide equivalent to the replaceable hydrogen present in the hydroxyl and acid groups respectively.

Since it is difficult to give absolute values for viscosity, relative values only will be given. The following method has been adopted for quantitatively estimating viscosity of the resin in solution. A solution of 4 gm. of the resin in 96 ml. chemically pure acetone is placed in an Ostwald type viscosimeter and the time of emptying determined at 25° C. Relative viscosity is given by the equation:

$$\text{Relative viscosity} = \frac{t_1 - t_2}{4t_2}$$

where $t_1$ is the time for emptying the solution from the viscosimeter and $t_2$ is the time for emptying the solvent from the viscosimeter.

*Example 1*

A mixture comprising 146 gm. adipic acid, 100 gm. diethylene glycol and 22.4 gm. pentaerythritol was heated together at atmospheric pressure for 1 hour at a temperature of 200° C. and continued for an additional 1½ hours at a reduced pressure of 10 mm. of mercury. The polyester resin which resulted had an acid number of 33.4, a hydroxyl number of 136.5 and a viscosity of 0.152.

*Example 2*

A mixture comprising 146 gm. adipic acid, 94 gm. diethylene glycol and 27.5 gm. trimethylolpropane was heated at atmospheric pressure for ½ hour at a temperature of 200° C. and continued for an additional 2¼ hours at 200° C. at a pressure of 10–15 mm. of mercury. The resulting polyester resin had an acid number of 20.7, a hydroxyl number of 69.2 and a viscosity of 0.105.

Example 3

A mixture comprising 146 gm. adipic acid, 112 gm. diethylene glycol and 7 gm. sorbitol was heated at atmospheric pressure up to a temperature of 240° C. and continued for an additional 2¾ hours at a temperature of 240–250° C. at a pressure of 10–15 mm. of mercury. The resulting polyester had an acid number of 20, a hydroxyl number of 61 and a viscosity of 0.089.

Example 4

A mixture of 202 gm. sebacic acid, 157 gm. triethylene glycol and 7 gm. pentaerythritol was heated, with stirring, in an atmosphere of nitrogen at ordinary atmospheric pressure for ½ hour as the temperature was raised to 250° C. This was followed by heating for 2 hours in vacuo at 250° C. The product was a polyester resin having an acid number of 13.9, a hydroxyl number of 44 and a viscosity of 0.118.

Example 5

A mixture of 100 gm. succinic anhydride, 115 gm. diethylene glycol and 7 gm. pentaerythritol was heated, with stirring, under nitrogen at atmospheric pressure for ½ hour as the temperature was raised to 250° C. This was followed by heating for 2 hours in vacuum at 250° C. The product had an acid number of 13, a hydroxyl number of 69 and a viscosity of 0.081.

Example 6

A mixture comprising 97 gm. azelaic acid, 210 gm. polyethylene glycol 400, and 10 gm. pentaerythritol was heated, with stirring, under nitrogen at atmospheric pressure for ½ hour at 250° C. This was followed by heating at 250° C. for 2 hours in vacuum. The polyester resin which was formed had an acid number of 13.7, a hydroxyl number of 59 and a viscosity of 0.096.

Example 7

A mixture of 146 gm. adipic acid, 150 gm. triethylene glycol and 7 gm. pentaerythritol was heated under nitrogen at atmospheric pressure, with stirring, for ½ hour. The temperature was raised rapidly to 250° C. and kept there. About 85% of the theoretical amount of water was removed during this period. The reaction was then continued under a pressure of 12–15 mm. mercury for 2 hours at 250° C. The resin product was light brown in color having an acid number of 15.6, a hydroxyl number of 46 and a viscosity of 0.124.

Example 8

A mixture of 134 gm. diglycolic acid, 157 gm. triethylene glycol and 7 gm. pentaerythritol was heated, with stirring, under nitrogen at atmospheric pressure for 15 minutes as the temperature was raised to 225° C. The reaction was then continued, with stirring, under vacuum for 1½ hours at 250° C. The polyester resin which resulted was brown in color, had an acid number of 9 and a viscosity of 0.083.

Example 9

A mixture of 132 gm. glutaric acid, 115 gm. diethylene glycol and 7 gm. pentaerythritol was heated under nitrogen at atmospheric pressure, with stirring, for ½ hour as the temperature was raised to 225° C. The reaction was then continued, with stirring, in vacuum, for 2 hours at 225° C. The resin product had an acid number of 14.7 and a hydroxyl number of 70.

Example 10

A mixture of 89 g. ethylene bis (glycolic acid), 57 g. of diethylene glycol, and 4 g. trimethylolethane was heated, with stirring under nitrogen at atmospheric pressure for 30 minutes up to a temperature of 250° C. The reaction was continued at 250° C. under a vacuum of 13–15 mm. for 2¼ hours. The resulting polyester resin had an acid number of 21 and a viscosity of 0.076.

Example 11

A mixture of 292 g. of adipic acid, 230 g. diethylene glycol and 16 g. trimethylol ethane was heated with stirring under nitrogen at atmospheric pressure for 45 minutes up to a temperature of 250° C. The reaction was continued an additional 2 hours under vacuum. The resulting polyester resin had an acid number of 8, a hydroxyl number of 56 and a viscosity of 0.098.

Example 12

A mixture of 73 gm. adipic acid, 3 gm. glycerol and 57.5 gm. diethylene glycol were heated in a nitrogen atmosphere at atmospheric pressure for 15 minutes as the temperature was raised to 290° C. This was followed by heating in vacuum at 250–280° C. for 105 minutes. The resin product had an acid number of 14.9, a hydroxyl number of 49 and a viscosity of 0.112.

Example 13

A mixture of 146 gm. adipic acid, 115 gm. diethylene glycol and 10 gm. of a commercial polyol known as "Triol 230" which has the chemical formula HOCH$_2$CH$_2$OCH$_2$C(CH$_3$)(CH$_2$OH)
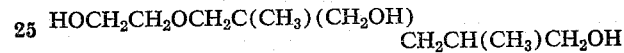
CH$_2$CH(CH$_3$)CH$_2$OH was heated under nitrogen at atmospheric pressure for ½ hour as the temperature was raised to 250° C. This was followed by 2 hours in vacuum at 250° C. The product had an acid number of 15, a hydroxyl number of 48 and a viscosity of 0.086.

Example 14

A mixture of 174 gm. dimethyladipate, 108 gm. diethylene glycol and 3 gm. glycerol and 0.1 gm. lead monoxide was heated, with stirring, under nitrogen at 225° C. for ½ hour at atmospheric pressure. This was followed by heating for 2 hours in vacuum at 200° C. The product had an acid number of 0.9, a hydroxyl number of 54 and a viscosity of 0.075.

In making the resins of the present invention, any polyethylene glycol may be used having the general formula HO(CH$_2$CH$_2$O)$_n$H where $n$ is greater than 1.

The acids which have been found most suitable are the simple dibasic acids having from 2 to 8 carbon atoms in a saturated chain between the terminal carboxyl groups. Examples of these acids are succinic, glutaric, adipic, sebacic, and azelaic. However, the acid may also have up to 2 non-adjacent ether oxygen atoms between the carboxyl groups. Examples of this type of acid are diglycolic acid and ethylene bis (glycolic acid). Pendant alkyl groups present in the acid only serve to weaken the ester product and are therefore not desirable when the product is to be used, for example, as an adhesive. The polyhydroxy compounds which have been found suitable for use in the present invention are alkyl compounds which contain more than 2 hydroxyl groups. Preferred members of this group of materials are glycerol, trimethylolethane, trimethylolpropane and pentaerythritol. The ratio of polyhydroxy compound to the rest of the ingredients of the reaction mixture depends upon the properties desired in the resin product. For many uses it is desired to have a high molecular weight together with a high hydroxyl number. This is important if crosslinking reactions are to be subsequently used to strengthen the molecular chains of the product. It is also preferred where it is desired to prepare resins which are sensitive to water or which are compatible with other polyhydroxyl compounds such as polyvinyl alcohols. In general, the larger the ratio of polyhydroxy compound which is used or the higher the number of hydroxyl groups per molecule, the greater will be the viscosity of the product. In general, the amount of polyhydroxy compound used is that sufficient to produce a resin having a viscosity of up to about 0.36, where the product also has a hydroxyl number up to 200 and an acid number up to 50.

Preferably the viscosity of the product is between 0.09 and 0.20, the hydroxyl number is between about 30 and 90 and the acid number is between 0 and 10.

For some uses it is desirable that the polyester compounds have hydroxyl groups included in the branch groups. Even though these branches are present in relatively small numbers, they are sufficient to introduce some cross-linking if the polyester is made to react with reagents which unite with hydroxyl groups. This cross-linking can be brought about by heating with dibasic acids but it is preferable, for purposes of the present invention, to bring about the reaction by milder methods. Thus, cross-linking of the polyesters of the present invention can be made to occur at room temperature by reaction of the polyesters with substances such as dialdehydes, divinyl ethers, bifunctional unsaturated carbonyl compounds, bis-epoxides and polyfunctional isocyanates. These reactions are important in the use of the resins as adhesives and flexible and rubbery products as the cross-linking gives added strength to the product.

In addition to using any of the dibasic acids mentioned above in preparing the resin, mixtures of any two or more of them can be used, for example, adipic and diglycolic or adipic and sebacic.

What is claimed is:

1. A process for making a polyester resin of viscous liquid consistency having an acid number not greater than 33.4 and a hydroxyl number not greater than 136.5 comprising reacting together with formation and evolution of water at least one saturated straight chain dibasic acid selected from the group consisting of succinic, glutaric, adipic, azelaic, sebacic, diglycolic and ethylene bis glycolic acids, a polyethylene glycol having the formula $HO(CH_2CH_2O)_nH$, where $n$ is greater than 1, and an alkyl polyhydroxyl compound containing more than two hydroxyl groups, said reaction being conducted under vacuum at about 200 to about 280° C. at least during the latter portion of the heating period after most of the water has been removed and until the viscosity of the polyester product of said reaction is at least about 0.05.

2. A process according to claim 1 wherein said vacuum is maintained during the major portion of the reaction period.

3. A process according to claim 2 wherein said vacuum is maintained until the viscosity of the polyester product of reaction is between about 0.5 and about 0.36.

4. A process according to claim 1 wherein said vacuum is maintained after prior heating at said temperature at substantially atmospheric pressure.

5. A process according to claim 4 wherein said prior heating is caused to take place in an atmosphere of nitrogen.

6. A process according to claim 1 in which said acid is adipic acid and said glycol is diethylene glycol.

7. A process according to claim 6 in which said polyhydroxy compound is pentaerythritol.

8. A process according to claim 6 in which said polyhydroxy compound is trimethylolpropane.

9. A process according to claim 6 in which said polydroxy compound is trimethylolethane.

10. A process according to claim 1 in which said acid is diglycolic acid and said glycol is triethylene glycol.

11. A process according to claim 1 in which said acid is used in the form of an ester of a low-boiling aliphatic alcohol.

12. A process according to claim 1 in which said acids are adipic and diglycolic.

13. A process according to claim 12 in which said glycol is diethylene glycol.

14. A process according to claim 1 in which said acids are sebacic and adipic.

References Cited in the file of this patent
UNITED STATES PATENTS

| | | |
|---|---|---|
| 1,714,173 | Kessler | May 21, 1929 |
| 2,111,762 | Ellis | Mar. 22, 1938 |
| 2,611,756 | Pockel | Sept. 23, 1952 |

OTHER REFERENCES

Norris: Experimental Organic Chemistry, p. 15, McGraw-Hill Book Co., N.Y. (1933).

Boundy-Boyer: Styrene, Its Polymers, Copolymers and Derivatives, pp. 270–272, Rheinbold Publ. Co., N.Y. (1952).

Perry: Chemical Engineers Handbook, p. 510, McGraw-Hill Book Co., N.Y. (1950).